United States Patent Office 2,923,408
Patented Feb. 2, 1960

2,923,408

FLOTATION PROCESS

Carl F. Williams, Pleasant Hill, Calif., assignor to The Dow Chemical Company, Midland, Mich., a corporation of Delaware No Drawing. Application December 27, 1954
Serial No. 477,951

3 Claims. (Cl. 209—166)

This invention relates to a method for the separation of minerals and is particularly directed to a method for separating clays from other minerals by selective flotation.

Clays occur frequently in admixture with ore and rock deposits and must be dealt with in operations for the separation and concentration of mineral values in such deposits. For example, small amounts of clay cause a particular problem in the beneficiation of sylvinite ores, such as those found in the Carlsbad district of New Mexico. In general, the latter ores are beneficiated by suspending the finely ground ore in a brine to form a pulp and separating the potassium chloride from the other constituents of the ore by flotation. In such operations, as pointed out, for example, in U.S. Patents 2,364,520 and 2,569,672, clay slimes have proved particularly troublesome, since such slimes have the undesirable characteristic of sorbing relatively large quantities of flotation agents, thus rendering them inactive.

It is an object of the present invention to provide an improved method for separating clay and clay-like minerals from ores. It is a further object to provide a method for selectively separating clay from other minerals by froth-flotation. Another object is to provide a process for the beneficiation of sylvinite ore, wherein said ore is deslimed by flotation. Other objects will become apparent from the following specification and claims.

According to the present invention it has been discovered that high molecular weight polymers of acrylamide are effective collectors for clay in froth-flotation processes. It is among the advantages of the invention that the acrylamide polymers have selective collector activity, whereby clays may be separated from other minerals by flotation.

The effective acrylamide polymers are water-soluble and characterized by a relatively small degree of cross-linking. They have a viscosity of at least about one centipoise for a 0.5 percent by weight solution of the polymer in distilled water adjusted to a pH of 3 to 3.5 and a temperature of 21.5° C. The term "viscosity" as hereinafter employed refers to the viscosity of a 0.5 percent solution of acrylamide polymer under the above conditions as measured with an Ostwald viscosimeter. The term "acrylamide polymer" includes not only the homopolymers of acrylamide but also co-polymers of acrylamide with up to 15 mole percent of other suitable monomers, such as methacrylamide, acrylic and methacrylic acids and the lower alkyl esters thereof, acrylonitrile, vinyl and vinylidene chlorides and the like, provided each such co-polymer is characterized by water solubility and viscosity properties as set forth above.

In carrying out the invention, the ore is ground and suspended in an aqueous medium to release the clay-minerals in finely divided form. The resulting suspension of mineral solids is admixed with a dilute aqueous solution of an effective acrylamide polymer and the resulting mixture is submitted to froth flotation in conventional fashion. In such operations, it is usual to employ a frothing agent and in general, good results have been obtained by use of frothing agents free of specific collector activity, such as, for example, cresylic acid, methyl isobutyl carbinol or the propylene glycol monoethers described in U.S. Patent 2,611,485.

In the preparation of aqueous solutions of the acrylamide polymer, the latter is mixed with water or an aqueous solution of soluble constituents of the ore to be treated, while the mixture is agitated vigorously, conveniently at room temperature. In such preparations, the acrylamide polymer may be employed in the dried flake or powdered form or the highly viscous concentrated aqueous compositions obtained by aqueous polymerization of acrylamide may be used directly. For direct application in mineral pulps, the dilute aqueous solutions of acrylamide polymer may contain from about 0.003 to about 0.5 percent by weight of polymer. In mill practice, it is convenient to prepare a concentrate consisting of an aqueous solution containing from about 1 to 5 percent by weight of the acrylamide polymer and to dilute this concentrate as needed to obtain the dilute aqueous treating solution. In preparing such concentrates it is preferred to employ water containing a minimum of polyvalent metal ions, such as ferric and aluminum ions, since such ions may render the concentrates gel-like and difficult to handle.

The amount of acrylamide polymer to be employed will vary depending upon such factors as the percentage of clay in the pulp, the type of clay and the degree of subdivision of the minerals. In general, from about 0.03 to about 1 pound of the polymer is employed per ton of ore solids. Increased proportions of the acrylamide polymer collector may sometimes be required as, for example, in the floating of ceramic clays or in the treatment of ores containing a high proportion of clay.

The present invention has been found particularly useful in the beneficiation of sylvinite ores. A froth-flotation process employing an acrylamide polymer as a collector for separating a clay concentrate prior to the floating of potassium chloride from sylvinite ores constitutes a preferred embodiment of the inevntion.

The following examples illustrate the invention but are not to be construed as limiting the same.

*Example 1*

250 grams of sylvinite ore, representative of the deposits in the Carlsbad, New Mexico, region and containing about 26 percent KCl, was ground to pass a 28 mesh screen and suspended in 250 milliliters of saturated brine prepared from the same ore. To the resulting pulp, a solution of 0.0375 gram of acrylamide polymer in 100 milliliters of the saturated brine was added portionwise with stirring during a period of about one minute. The polymer employed had a viscosity of 7 centipoises. The above treatment resulted in the introduction of acrylamide polymer at the rate of 0.3 pound per ton of ore. The treated pulp was transferred to a 950 milliliter minerals separation subaeration type flotation machine and additional saturated brine added to fill the machine. The pulp was then conditioned for a period of about 15 seconds with polypropylene glycol methyl ether (Dowfroth 250) at the rate of 0.16 pound per ton of ore and submitted to froth flotation. A clay concentrate was separated for a period of 4 minutes. The remaining pulp was then conditioned with a long chain aliphatic amine acetate (Armac TD) at the rate of 0.5 pound per ton of ore and postassium chloride-bearing froth separated for 3 minutes. The results are set forth in the following table, together with the results for a typical separation of clay by the conventional process of desliming by decantation. In the desliming operation, a pulp of 250 grams of crushed ore in 250 milliliters of saturated brine was prepared as above, agitated thoroughly to release the clay particles and then held undisturbed for a short period of time to allow most of the salt crystals to settle. The supernatant liquid containing suspended clay was then decanted. These washing and decanting steps were repeated twice more with 250 milliliter portions of the brine and the three portions of decanted slimes were combined and assayed as "clay concentrate." The washed crystal pulp was transferred to the flotation machine with sufficient brine to fill the cell. Armac TD (0.5 pound per ton) and Dowfroth 250 (0.16 pound per ton) were added and the flotation of a potassium chloride concentrate carried out as before. In the table the results are summarized in terms of the assay of the potassium chloride (KCl) concentrate and the percent of the total potassium chloride recovered in the clay concentrate, potassium chloride concentrate and tailings.

| Acrylamide Polymer, Pounds/ton | Percent by Weight of KCl in KCl Concentrate | Percent of Available KCl Recovered in— | | |
|---|---|---|---|---|
| | | Clay Conc. | KCl Conc. | Tails |
| 0.30 | 84.4 | 4.0 | 83.6 | 12.4 |
| None | 81.0 | 18.1 | 75.3 | 6.6 |

*Example 2*

Further samples of the sylvinite ore prepared as in Example 1 were conditioned with acrylamide polymers of varying viscosities. The frothing agent and flotation techniques employed were as in Example 1 except that the acrylamide polymer was added in one-half minute and the frothing time for the potassium chloride concentrate was from 2 to 3 minutes, in which time it appeared that the separation of potassium chloride was essentially complete. The amount and viscosity of acrylamide polymer, frothing times for the clay concentrate and results of the separations are summarized in the following table:

| Acrylamide Polymer | | Clay-bearing Froth Time, Minutes | Percent by Weight of KCl in KCl Concentrate | Percent of Available KCl Recovered in— | | |
|---|---|---|---|---|---|---|
| Viscosity, Centipoises | Pound/ton | | | Clay Concentrate | KCl Concentrate | Tails |
| 1.8 | 0.22 | 4 | 87.8 | 2.8 | 81.0 | 16.2 |
| 5.2 | 0.22 | 3 | 85.7 | 5.1 | 82.9 | 12.0 |
| 7.0 | 0.22 | 4 | 86.6 | 4.9 | 85.1 | 10.0 |
| 11.5 | 0.22 | 4 | 83.0 | 2.9 | 89.1 | 8.0 |
| 11.5 | 0.11 | 2.5 | 85.1 | 6.5 | 79.5 | 14.0 |
| 80.0 | 0.031 | 2 | 86.7 | 11.2 | 67.3 | 21.5 |

*Example 3*

Further determinations were carried out following the procedure of Example 2 employing 0.22 pound of the acrylamide polymer of Example 1 per ton of ore. These determinations were designed to demonstrate the applicability of other frothing agents. The results obtained were as follows:

| Frother | Pounds of Frother per Ton of Ore | Percent of Available KCl Recovered in— | | |
|---|---|---|---|---|
| | | Clay Conc. | KCl Conc. | Tails |
| Methyl-isobutyl carbinol | 0.32 | 5.1 | 82.2 | 12.7 |
| Cresylic Acid | 0.48 | 4.2 | 80.2 | 15.6 |

*Example 4*

Sylvinite ore pulp prepared as in Example 1 was conditioned with 0.6 pound of the acrylamide polymer of Example 1 per ton of ore and a clay concentrate floated off following the technique and employing the frothing agent of Example 1. Thereafter, Armac TD was added to the pulp at the rate of 0.25 pound per ton of ore and a potassium chloride-bearing froth was separated for 3 minutes. The percentage distribution of potassium chloride was as follows: Clay concentrate 2.7 percent, potassium chloride concentrate, 86.5 percent; and tails 10.8 percent. The potassium chloride concentrate assayed 81 percent KCl.

In the above examples it will be noted that the acrylamide polymer of the present invention demonstrates selective collector activity for clay, whereby the clay concentrate carries with it considerably less potassium chloride than is lost in the decantation procedure. The loss of potassium chloride values in the clay concentrate is particularly undesirable in that little can be done in the way of recovering the values from the clay concentrate except by expensive thermal methods. Values left in the tails, on the other hand, can be recovered by a scavenger flotation, as shown, for example by the following determinations.

*Example 5*

A solution of 0.0275 gram of the acrylamide polymer of Example 1 in 100 milliliters of saturated brine prepared from sylvinite ore was added in 3 approximately equal portions with stirring during a period of 0.5 minute to a pulp containing 250 grams of sylvinite ore prepared as in Example 1. The above treatment resulted in the introduction into the pulp of acrylamide polymer at the rate of 0.22 pound per ton of ore. The treated pulp was transferred to the flotation machine, brought to volume as in the preceding examples and conditioned for a period of about 15 seconds with 0.16 pound of Dowfroth 250 per ton of ore. Aeration was then begun and a clay concentrate was separated for a period of about 4 minutes. Thereafter the pulp was conditioned with Armac TD at the rate of 0.5 pound per ton of ore and a rougher concentrate of potassium chloride was separated. The remaining pulp, corresponding to the tails of the preceding examples, was then subjected to two further froth flotations with additional Armac TD at the rate of 0.5 pound per ton before each flotation period to separate first and second scavenger concentrates. The results are summarized in the following table:

| | Percent by Weight KCl | Percent of KCl Recovered |
|---|---|---|
| Heads (Employed as Cell Feed) | 26.2 | 100 |
| Clay Concentrate | | 3.6 |
| Rougher Concentrate | 84.9 | 81.6 |
| First scavenger concentrate | 52.8 | 9.5 |
| Second scavenger concentrate | 24.7 | 2.2 |
| Tails | 1.3 | 3.1 |

It will be noted that the recovery of potassium chloride in the rougher and scavenger stages of flotation totaled 93.3 percent and the scavenger concentrates were of suitable grade for recycling to the rougher cell.

I claim:
1. In the preparation of sylvinite ore for the recovery of potassium chloride by flotation, the method which comprises the steps of suspending ground sylvinite ore in brine saturated with respect to said ore to form a pulp, conditioning said pulp with a frother and with a water-soluble acrylamide polymer characterized by a viscosity of from 1.8 to 80 centiposes for a 0.5 percent by weight solution thereof in distilled water adjusted to a pH of 3 to 3.5 and at a temperature of 21.5° C., subjecting the conditioned pulp to froth flotation and separating clay therefrom as a flotated concentrate, the polymer employed being selected from the group consisting of homopolymers of acrylamide and copolymers of acrylamide with up to 15 mole percent of acrylic acid.

2. A method which comprises the successive steps of suspending ground sylvinite ore in brine saturated with respect thereto, conditioning the resulting pulp with a frothing agent and a water-soluble acrylamide polymer characterized by a viscosity of from 1.8 to 80 centipoises for a 0.5 percent solution thereof in distilled water adjusted to a pH of 3 to 3.5 and a temperature of 21.5° C., subjecting said pulp to froth flotation to separate clay as a flotated clay concentrate, conditioning the remaining pulp with a potassium chloride collector and recovering a crystalline potassium chloride concentrate from the pulp by froth flotation, the polymer employed being selected from the group consisting of homopolymers of acrylamide and copolymers of acrylamide with up to 15 mole percent of acrylic acid.

3. A method according to claim 1, wherein the acrylamide polymer is employed in the amount of from about 0.03 to about 1 pound per ton of ore.

References Cited in the file of this patent

UNITED STATES PATENTS

| | | |
|---|---|---|
| 2,347,576 | Ogilley | Apr. 25, 1944 |
| 2,569,672 | Jackson | Oct. 2, 1951 |
| 2,694,702 | Jones | Nov. 16, 1954 |
| 2,696,912 | Atwood et al. | Dec. 14, 1954 |
| 2,740,522 | Aimone et al. | Apr. 3, 1956 |

FOREIGN PATENTS

| | | |
|---|---|---|
| 154,799 | Australia | Jan. 19, 1954 |

OTHER REFERENCES

Michaels: "Aggregation of Suspensions by Polyelectrolytes," Industrial and Engineering Chemistry, July 1954, pages 1485–1490.